United States Patent Office 2,744,109
Patented May 1, 1956

2,744,109

3-ETHYLENE MERCAPTOLES OF 21-HYDROXY-4-PREGNENE-3,20-DIONE, ITS 17-HYDROXY DERIVATIVE AND ESTERS THEREOF

Jack W. Ralls, Morton Grove, Ill., assignor, by mesne assignments, to G. D. Searle & Co., Skokie, Ill., a corporation of Delaware No Drawing. Application January 13, 1955,
Serial No. 481,688

7 Claims. (Cl. 260—239.5)

The present invention relates to a new group of monomercaptoles of polyketo steroids and, more specifically, to 3-ethylene mercaptoles of the 21-hydroxy-4-pregnene-3,20-diones, their 17-hydroxy derivatives and esters thereof.

The compounds which constitute my invention can be represented by the general structural formula

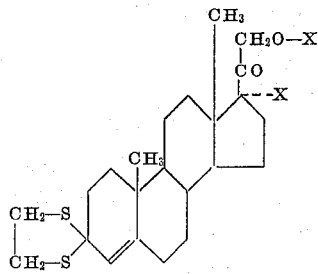

wherein X is a member of the class consisting of hydrogen, benzoyl and lower alkanoyl radicals and Y is a member of the class consisting of hydrogen and hydroxyl radicals. Among the lower alkanoyl radicals which X can represent are formyl, acetyl, propionyl, butanoyl, pentanoyl, hexanoyl, cyclohexaneacetyl cyclopentanepropionyl, and the like.

It has been found that condensation of 21-hydroxy-4-pregnene-3,20-diones, their esters, and their 17-hydroxy derivatives with ethanedithiol under mild conditions, such as using acetic acid as a solvent and p-toluenesulfonic acid as a catalyst, permits formation of the monomercaptole. The 20-keto group thus remains free to undergo ketonic reactions such as reduction to the carbinol on treatment with sodium borohydride. The process of formation of the mercaptole is not accompanied by rearrangement of the 4,5-double bond to the 5,6 position. After operation on the 20-keto group, the 3-ethylene mercaptole group can be reconverted conveniently to a 3-keto group by treatment with mercuric chloride and cadmium carbonate in aqueous acetone.

The compounds of this invention are also valuable pharmaceutical agents. It has been found that these 3-ethylene mercaptoles inhibit the pharmacological effect of the 3-ketosteroids from which they are derived. Especially the claimed compounds antagonize the sodium retaining and hypertensive effects of desoxycorticosterone and its esters.

The following examples illustrate in further detail some of the compounds which constitute the invention and methods for their synthesis. However, the invention is not to be construed as limited in spirit and in scope by the details set forth therein. It will be apparent to those skilled in the art that numerous modifications in materials and methods can be adopted without departing from the invention in spirit or in scope. In these examples quantities of materials are indicated as parts by weight.

This application is a continuation-in-part of my copending application, Serial No. 425,023, filed April 22, 1954.

Example 1

A solution of 11.64 parts of 17α-hydroxy-21-acetoxy-4-pregnene-3,20-dione in 263 parts of warm acetic acid is treated with 2.46 parts of ethanedithiol and a solution of 2.7 parts of p-toluenesulfonic acid monohydrate in 30 parts of acetic acid. After 17 hours standing at room temperature, the crystalline precipitate is collected on a filter and recrystallized from acetone. 17α-hydroxy-21-acetoxy - 4 - pregnene-3,20 - dione 3 - ethylene mercaptole thus obtained melts at about 227–229° C. The rotation of a 1% chloroform solution is $\alpha_D = +154°$. The infrared absorption spectrum as determined in a potassium bromide disc shows maxima at 2.95, 5.80, 7.30, 7.92, 8.08, and 9.58 microns.

Example 2

To a solution of 11.6 parts of 17, 21-dihydroxy-4-pregnene-3,20-dione in 270 parts of warm acetic acid are added 2.46 parts of ethanedithiol and a solution of 2.7 parts of p-toluenesulfonic acid monohydrate in 32 parts of acetic acid. The mixture is maintained at 25° C. for an hour and then poured into water. The reaction mixture is then extracted with chloroform and the chloroform solution is washed successively with water, 5% potassium hydroxide solution and again with water. The extract is dried over anhydrous sodium sulfate, filtered and evaporated to yield 17, 21-dihydroxy-4-pregnene-3,-20-dione 3-ethylene mercaptole as a solid. The infrared absorption spectrum shows maxima at 2.92, 5.78, and 9.52 microns.

Example 3

To a solution of 18.63 parts of 21-acetoxy-4-pregnene-3,20-dione in 250 parts of acetic acid are added 4.63 parts of ethanedithiol and a solution of 4.6 parts of p-toluenesulfonic acid monohydrate in 15 parts of acetic acid. After 90 minutes standing at room temperature, the crystalline precipitate is collected on a filter and washed successively with cold acetic acid and cold methanol. It is then crystallized from ethyl acetate to yield 21-acetoxy - 4 - pregnene - 3,20 - dione 3 - ethylene mercaptole melting at about 175–176° C. The compound shows no absorption maxima in the ultraviolet region from 220 to 360 millimicrons. Major infrared absorption maxima are observed at 5.70, 5.80, 8.08, medium intensity maxima at 7.28 and 9.44 microns, and minor maxima at 6.95, 7.08, 7.82, and 11.72 microns. The specific rotation of a 1.19% solution in chloroform is $+197°$.

Example 4

To a mixture of 41 parts of 21-hydroxy-4-pregnene-3,20-dione in 700 parts of acetic acid and 13 parts of ethanedithiol is added a solution of 12.5 parts of p-toluenesulfonic acid monohydrate in 140 parts of acetic acid. The reaction mixture is maintained at 20° C. for 2 hours and then poured into water and extracted with chloroform. This extract is washed successively with water, 5% sodium hydroxide solution and once more with water. It is then dried over anhydrous calcium sulfate, filtered and evaporated to yield a solid residue which on recrystallization from ethyl acetate yields 21-hydroxy-4-pregnene-3,20-dione 3-ethylene mercaptole as white needles. The infrared absorption spectrum, as determined in a potassium bromide disc, shows maxima at 2.91, 5.82, and 9.52 microns.

Example 5

A mixture of 48.3 parts of the β-cyclopentyl-propionate of 11-desoxycorticosterone, 8.2 parts of ethanedithiol, 9 parts of p-toluenesulfonic acid monohydrate and 1000 parts of acetic acid is stirred for 5 hours and then poured into water. The resulting suspension is extracted with chloroform. The extract is washed successively with water, 5% sodium hydroxide solution, and water. After drying over anhydrous sodium sulfate and evaporation of the solvent, one obtains as a residue 21-(β-cyclopentyl-propionyloxy)-4-pregnene-3,20-dione 3-ethylene mercaptole which has the structural formula

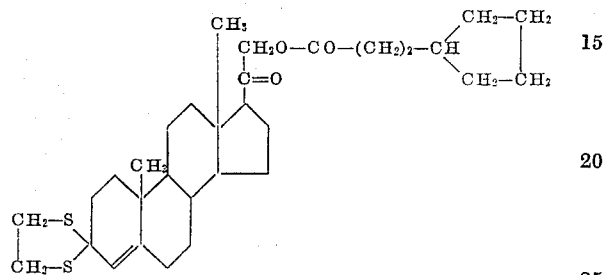

Example 6

When the reaction of the foregoing example is carried out employing 46.5 parts of the benzoate of 11-desoxycorticosterone instead of the β-cyclopentylpropionate one obtains on crystallization from ethyl acetate 21-benzoyloxy-4-pregnene-3,20-dione 3-ethylene mercaptole in white needles. The infrared absorption spectrum shows maxima at 5.85, 7.82, 8.92, 9.52 and 13.88 microns.

I claim:

1. A compound of the structural formula

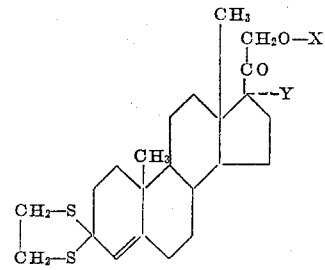

wherein X is a member of the class consisting of hydrogen, benzoyl and lower alkanoyl radicals and Y is a member of the class consisting of hydrogen and hydroxyl radicals.

2. A compound of the structural formula

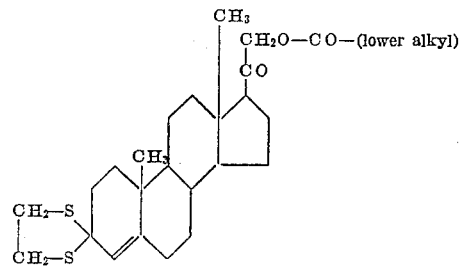

3. A compound of the structural formula

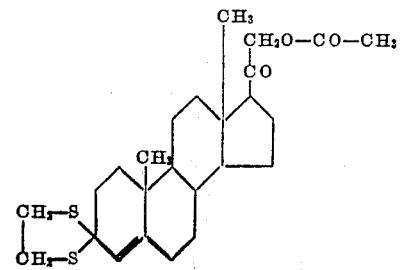

4. A compound of the structural formula

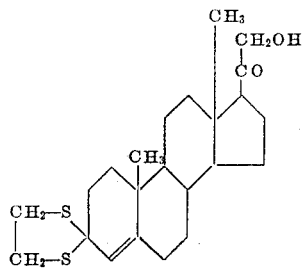

5. A compound of the structural formula

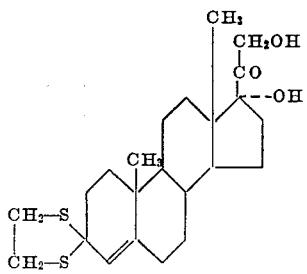

6. A compound of the structural formula

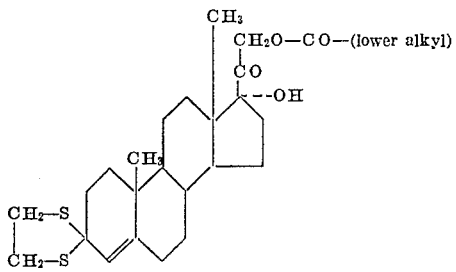

7. A compound of the structural formula

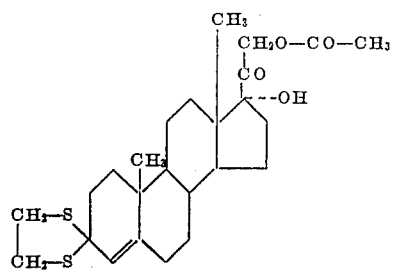

References Cited in the file of this patent
UNITED STATES PATENTS 2,352,568    Reichstein _____ July 27, 1944

OTHER REFERENCES

Antomucci: J. Org. Chem., October 1952, pp. 1369–74 and 1341–50.